(12) United States Patent
Yucetas

(10) Patent No.: US 11,808,489 B2
(45) Date of Patent: Nov. 7, 2023

(54) GAS INJECTION SYSTEM

(71) Applicant: ME WELL SERVICES PETROL VE SAHA HIZMETLERI SAN. TIC. LTD. STI., Diyarbakir (TR)

(72) Inventor: Ismet Yucetas, Diyarbakir (TR)

(73) Assignee: ME WELL SERVICES PETROL VE SAHA HIZMETLERI SAN. TIC. LTD. STI., Diyarbakir (TR)

( * ) Notice: Subject to any disclaimer, the term of this patent is extended or adjusted under 35 U.S.C. 154(b) by 748 days.

(21) Appl. No.: 17/282,790

(22) PCT Filed: Feb. 21, 2019

(86) PCT No.: PCT/TR2019/050117
§ 371 (c)(1),
(2) Date: Apr. 5, 2021

(87) PCT Pub. No.: WO2019/164467
PCT Pub. Date: Aug. 29, 2019

(65) Prior Publication Data
US 2022/0003460 A1   Jan. 6, 2022

(30) Foreign Application Priority Data
Feb. 21, 2018   (TR) .................. 2018/02472

(51) Int. Cl.
*F28D 7/00*     (2006.01)
*F24T 10/20*    (2018.01)
*F24T 50/00*    (2018.01)

(52) U.S. Cl.
CPC ............. *F24T 10/20* (2018.05); *F24T 50/00* (2018.05)

(58) Field of Classification Search
CPC .................................. F24T 10/20; F24T 50/00
USPC ........................................................... 165/45
See application file for complete search history.

(56) References Cited

U.S. PATENT DOCUMENTS

| | | | |
|---|---|---|---|
| 5,526,646 A * | 6/1996 | Bronicki | .............. F03G 7/04 |
| | | | 165/45 |
| 5,694,772 A | 12/1997 | Weinberg et al. | |
| 5,816,048 A | 10/1998 | Bronicki et al. | |
| 5,965,031 A | 10/1999 | Kitz et al. | |
| (Continued) | | | |

FOREIGN PATENT DOCUMENTS

| | | |
|---|---|---|
| CH | 710999 A2 | 10/2016 |
| WO | 2014140756 A2 | 9/2014 |
| WO | 2017072644 A1 | 5/2017 |

*Primary Examiner* — Davis D Hwu
(74) *Attorney, Agent, or Firm* — Bayramoglu Law Offices LLC

(57) ABSTRACT

A gas injection system is provided. The gas injection system includes at least a first line a reinjection water and a pressure of the reinjection water is increased, and gases from a compressor, a pressure of the gases are increased, are gathered and delivered to a reservoir by a reinjection well; at least a first delivery line to deliver a gas, a pressure of the gas is increased, to the first line; at least a second delivery line to deliver the reinjection water, the pressure of the reinjection water is increased, to the first line; at least a first outlet line in communication with the first line, another side of the first outlet line communicates with a lower part of the reinjection well, and enables to deliver a mixture received from the first line to the lower part of the reinjection well.

5 Claims, 3 Drawing Sheets

(56) References Cited

U.S. PATENT DOCUMENTS

| | | | | |
|---|---|---|---|---|
| 8,281,861 B2* | 10/2012 | Nguyen | ............... | E21B 44/02 166/57 |
| 2014/0075938 A1* | 3/2014 | Bronicki | ............... | F24T 10/20 60/641.1 |

* cited by examiner

GAS INJECTION SYSTEM

CROSS REFERENCE TO THE RELATED APPLICATIONS

This application is the national stage entry of International Application No. PCT/TR2019/050117, filed on Feb. 21, 2021, which is based upon and claims priority to Turkish Patent Application No. 2018/02472, filed on Feb. 21, 2021, the entire contents of which are incorporated herein by reference.

TECHNICAL FIELD

The present invention relates to a non-condensable gas injection system developed for reducing non-condensable gases that are emitted by geothermal power plants. This system is also applicable for permanent underground sequestration of NGCs in depleted oil and gas reservoirs or saline aquifers.

BACKGROUND

Geothermal energy plays an important role among renewable energy sources. However, though geothermal energy is a clean energy source, one of the most important environmental factors associated with the geothermal plants is non-condensable gases released by the geothermal fluid. Geothermal fluids include non-condensable gases such as carbon dioxide, hydrogen sulphide, hydrogen, nitrogen, ammonia, mercury, boron vapour, radon and methane. While the amount of non-condensable gases present in the geothermal vapour varies depending on the geothermal fields, it generally ranges from 1% to 21% by weight of said vapour. Among such gases, the most environmentally important ones are the carbon dioxide that constitutes 96% to 99% by weight, and the hydrogen sulphide that constitutes less than 1% thereof. Additionally, when drilling for and refining hydrocarbons from oil and gas reservoirs, carbon dioxide and other harmful gases are released. Carbon dioxide leads to global issues due to greenhouse effect that it created, and the hydrogen sulphide causes environmental problems as a result of its toxic effect.

The known state of art covers various applications developed for injecting non-condensable gases present in the geothermal fluid utilized at geothermal power plants. One of these applications is disclosed in document WO2014140756A2, in which there is disclosed a geothermal based heat utilization system for preventing scaling of geothermal fluid in a heat exchanger, and a method for treating water which is performed with said system. The system comprises a mixing unit to mix geothermal fluid, condensate and non-condensable gases. Since the fluid from said mixing unit to the exchanger is acidified by dissolving the gases its the geothermal water, it is prevented from being scaled on the exchanger. However, said application cannot provide a solution for reducing non-condensable gases that are emitted by geothermal power plants.

SUMMARY

With the present invention, there is developed a gas injection system suitable for use in a geothermal plant comprising at least one reinjection well which enables the geothermal fluid received from a geothermal energy source via at least one production well to be delivered again to the geothermal energy source after being treated. Said system comprises at least one exchanger to which non-condensable gases from the plant are delivered and which allows decreasing temperature of said gases; at least one storage to which said gases, temperatures of which are decreased by said exchanger, are delivered and stored therein; at least one compressor which is provided at an outlet of said storage and allows increasing pressure of the gases received from the storage; at least one pump which allows increasing pressure of at least one part of the reinjection water received from said plant; at least a first line in which reinjection water, which is received from said pump and the pressure of which is increased, and gases from said compressor, the pressure of which are increased, are gathered and delivered to the reservoir by said reinjection well; at least a first delivery line which enables to deliver the gas, the pressure of which is increased, to said first line; at least a second delivery line which enables to deliver the reinjection water, the pressure of which is increased, to said first line; at least a first outlet line which is in communication with said first line on at least one side, at least another side of which communicates with a lower part of the reinjection well, and which enables to deliver the reinjection water, received from the first line and the pressure of which is increased, and the gases, the pressure of which are increased, to said lower part of the reinjection well; at least one water delivery line to allow receiving non-pressurized part of the reinjection water from said plant; and at least a second outlet line which enables to deliver the relatively low-pressure reinjection water that is received from the water delivery line to the reinjection well.

Said gas injection system provides to minimize greenhouse effects that are gradually made themselves more apparent in the global and local scale, and to extend productivity spans of the geothermal plants such that their activeness are maintained for a long period of time. Two phase two string methodology of said gas injection system also allows for permanent deposition of Carbon Dioxide in Plugged and Abandoned wells through Structural Trapping (Cap Rock Deposition) and Residual Trapping (Gas phase immobilization due to the effects of relative permeability and capillary pressure).

An object of the present invention is to provide a non-condensable gas injection system for reducing emission of non-condensable gases produced by the geothermal fluid in the geothermal power plants.

Another object of the present invention is to provide a non-condensable gas injection system for reducing emission of non-condensable gases emitted by the geothermal power plants, in which non-condensable gases are pumped back into the reservoir where they are produced.

Yet another object of the present invention is to provide a gas injection system which allows pumping the carbon dioxide and the hydrogen sulphide back into the reservoir where they are produced, wherein the carbon dioxide generates greenhouse effect within the non-condensable gases produced by the geothermal fluid and the hydrogen sulphide is known for its unpleasant smell and generates toxic effect.

A further object of the present invention is to facilitate gas injection of non-condensable gases emitted by hydrocarbon refining and use in which said gases come above ground through crude oil and natural gas and are returned to the reservoir.

BRIEF DESCRIPTION OF THE DRAWINGS

Exemplary embodiments of the gas injection system according to the present invention are illustrated in the accompanying drawings, in which.

Figure 1:
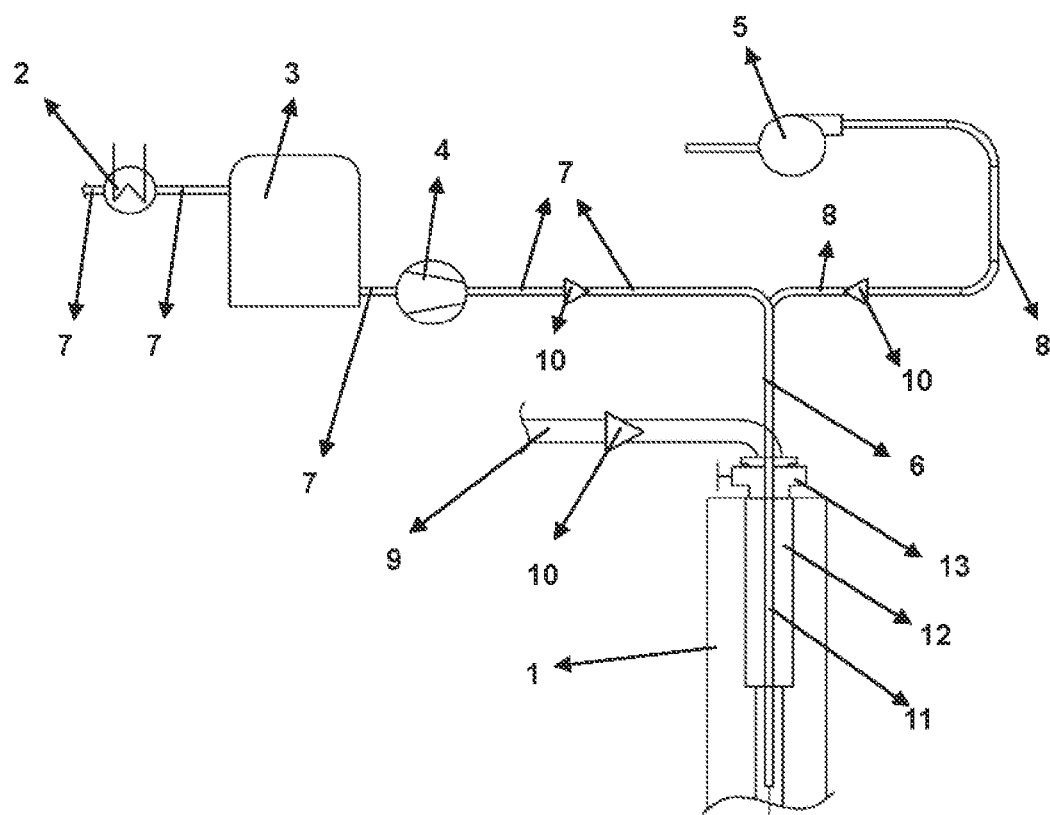
FIG. 1 is a schematic view of an exemplary embodiment of the gas injection system according to the present invention.

All the parts illustrated in the drawings are individually assigned a reference numeral and the corresponding terms of these numbers are listed as follows:

| | |
|---|---|
| Reinjection well | (1) |
| Exchanger | (2) |
| Storage | (3) |
| Compressor | (4) |
| Pump | (5) |
| First line | (6) |
| First delivery line | (7) |
| Second delivery line | (8) |
| Water delivery line | (9) |
| Check valve | (10) |
| First outlet line | (11) |
| Outlet hole | (11a) |
| Second outlet line | (12) |
| Well inlet valve | (13) |

DETAILED DESCRIPTION OF THE EMBODIMENTS

Geothermal energy plays an important role among renewable energy sources. However, though geothermal energy is a clean energy source, one of the most important environmental factors associated with the geothermal plants is non-condensable gases released by the geothermal fluid. Geothermal fluids include non-condensable gases such as carbon dioxide, hydrogen sulphide, hydrogen, nitrogen, ammonia, mercury, boron vapour, radon and methane. While the amount of non-condensable gases present in the geothermal steam varies depending on the geothermal fields, it generally ranges from 10% to 21% by weight of said steam. Among such gases, the most environmentally important ones are the carbon dioxide that constitutes 96% to 99% by weight, and the hydrogen sulphide that constitutes less than 1% thereof. Carbon dioxide leads to global issues due to greenhouse effect that it created, and the hydrogen sulphide causes environmental problems as a result of its toxic effect. For that reason, with the present invention, there is developed a gas injection system for reducing emissions of the non-condensable gases emitted by the geothermal power plants, in which non-condensable gases are pumped back into the reservoir where they are produced.

The gas injection system according to the present invention, as illustrated in FIG. 1, suitable for use in a geothermal plant comprising at least one reinjection well (1) which enables the geothermal fluid received from a geothermal energy source (reservoir) via at least one production well (not shown in the figures) to be delivered again to the geothermal energy source after being treated, the gas injection system comprises: at least one exchanger (2) to which non-condensable gases from the plant are delivered and which allows decreasing temperature of said gases (preferably allows decreasing it from 65° C. to 40° C.); at least one storage (3) to which said gases, temperatures of which are decreased by said exchanger (2), are delivered and stored therein; at least one compressor (4) which is provided at an outlet of said storage (3) and allows increasing pressure of the gases received from the storage (3) (preferably allows increasing it to 55 bar); at least one pump (5) which allows increasing pressure of at least one part of the reinjection water (brine) received from said plant (preferably allows increasing it to a pressure of 70 bar); at least a first line (6) in which reinjection water, which is received from said pump (5) and the pressure of which is increased, and gases from said compressor (4), the pressure of which are increased, are gathered and delivered to the reservoir by said reinjection well (1); at least a first delivery line (7) which enables to deliver the gas, the pressure of which is increased, to said first line (6); at least a second delivery line (8) which enables to deliver the reinjection water, the pressure of which is increased, to said first line (6); at least a first outlet line (11) which is in communication with said first line (6) on at least one side, at least another side of which communicates with a lower part of the reinjection well (1) (preferably with a point 800 meters below the surface), and which enables to deliver the reinjection water, received from the first line (6) and the pressure of which is increased, and the gases, the pressure of which are increased, to said lower part of the reinjection well (1); at least one water delivery line (9) to allow receiving non-pressurized part of the reinjection water from said plant; and at least a second outlet line (12) which enables to deliver the relatively low-pressure (preferably at a pressure of 55 bar) reinjection water that is received from the water delivery line (9) to the reinjection well (1).

In an exemplary embodiment of the invention, for example, non-condensable gases comprised within the geothermal fluid which is drawn from the reservoir by the geothermal plant for electrical energy production are delivered to the exchanger (2) through said first delivery line (7). According to the Henry's Law, dissolubility of a gas in a liquid decreases as the temperature rises. On condition that the temperature remains constant, dissolubility of a component in the liquid phase is directly proportional to the partial pressure in the gaseous or vapour phase thereof. Based on this principle, first of all, temperature of the gases from the plant is decreased by said exchanger (2) from 65° C. to 40° C. and then delivered to said storage (3) through said first delivery line (7), after that, the gas stored is delivered to said compressor (4) through the first delivery line (7), again, so as to pressurize it up to 55 bar. In the meantime, pressure of at least one part of the reinjection water received from the plant is increased by said pump (5) to a pressure of 70 bar, and the gas, the pressure of which is increased by the compressor (4), and the reinjection water from the plant, the pressure of which is increased to a pressure of 70 bar, are gathered together in the said first line (6) so as to pumped them into said reinjection well (1) through the first outlet line (11) (e.g. as in the "aerated drilling" system utilized for drilling industry). Furthermore, non-pressurized part of the reinjection water received from the plant is pumped into the reinjection well (1) via the water delivery line and the second outlet line (12). Here, said non-condensable gases are mixed with the pressurized reinjection water at the inlet of the reinjection well (1), and this mixture is mixed with the reinjection water, the pressure of which is not increased, at a lower part of the reinjection well (1) (preferably at 800 meters below the surface). By this way, the gas injection system according to the present invention is enabled to be a dual-phase and dual-line system.

In a preferred embodiment of the invention, returns are prevented by the check valves (10) which are provided on the first delivery line (7), the second delivery line (8) and the water delivery line (9), and said operations are able to be controlled and monitored by control valves, flow meters, thermometers and pH meters provided on said lines. Yet in another preferred embodiment, said system comprises at least one control unit to which said pressure control valve, flow meter, thermometer and pH meter are connected.

In another preferred embodiment of the invention, said first outlet line (11) is in the form of a tube (for example, with a diameter of 2 inches) which is preferably 800 meters in length. In this embodiment, there is provided at least one (preferably multiple) outlet hole (11a) at a side of the outlet line (11) which is away from the first line (6). By this way, it is ensured that the mixture of gas/reinjection water passing through the first outlet line (11) is safely pumped into a desired depth of the reinjection well (1).

Thanks to said system, a closed cycle is formed between the production and reinjection wells, thereby the non-condensable gases produced by the geothermal fluid are allowed to be pumped back into the reservoir, not to the atmosphere, through the reinjection wells.

Figure 2:
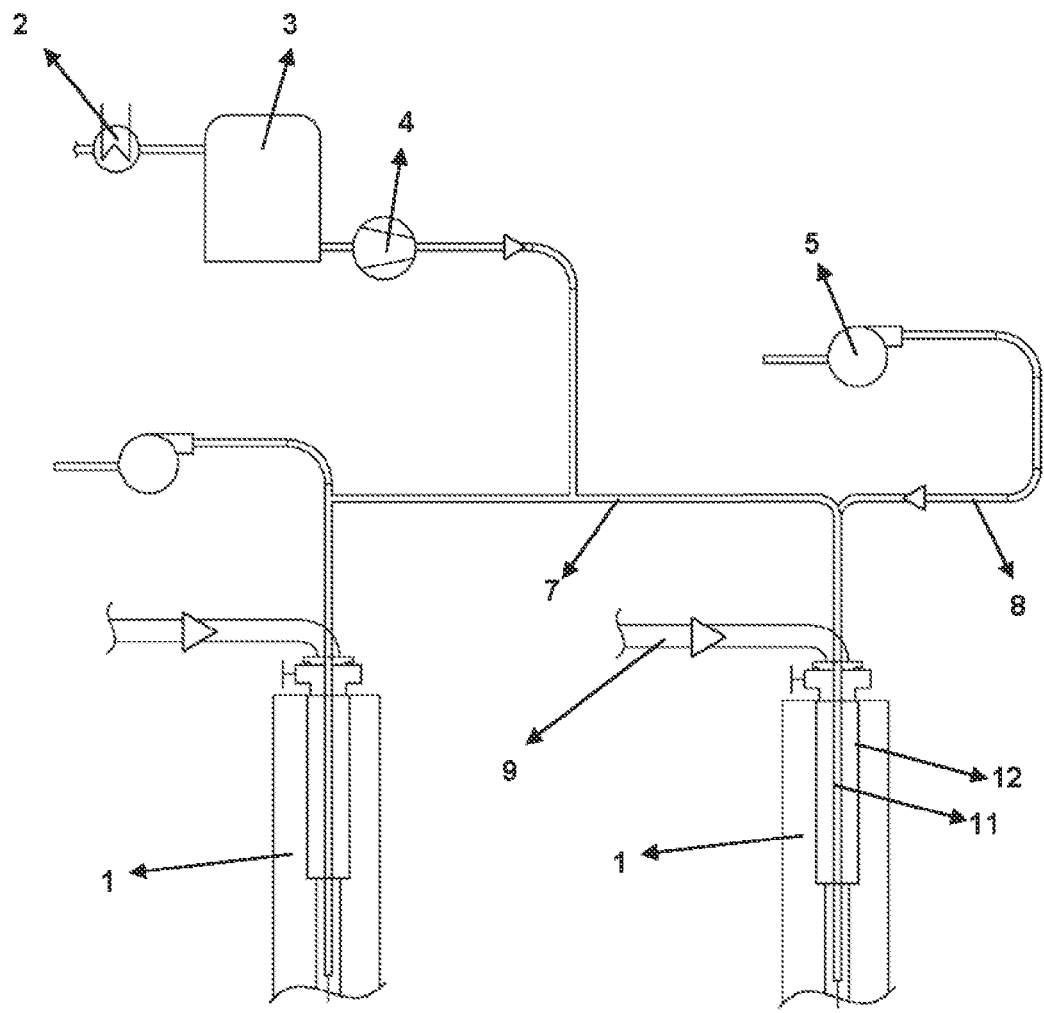
FIG. 2 is a schematic view of another exemplary embodiment of the gas injection system according to the present invention.
Figure 3:
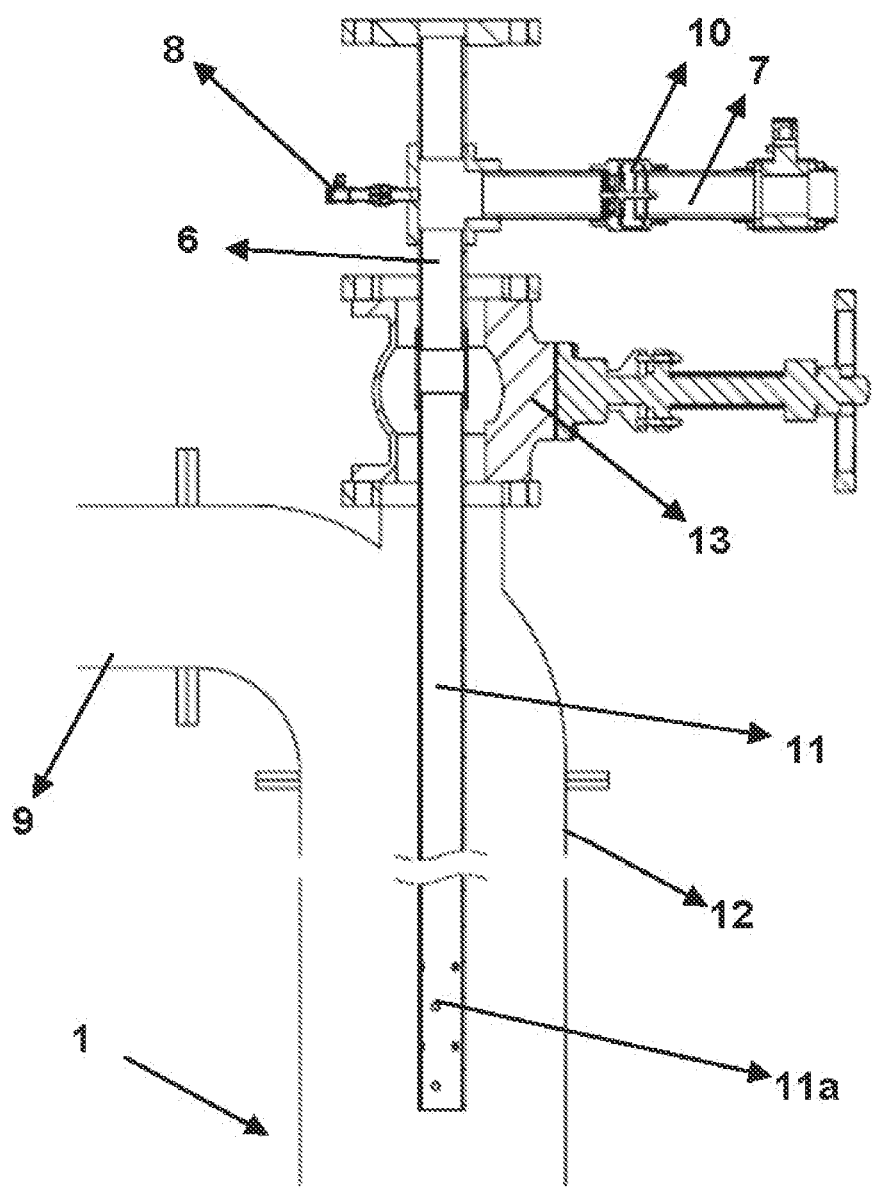
FIG. 3 is an exemplary detailed view of the gas injection system according to the present invention.

In an alternative embodiment of the invention which is illustrated in FIG. 2, the gas to be pumped into the reinjection well (1) is able to be received from at least another reinjection well (1), too. By this way, it is ensured that gases of the plurality of reinjection wells (1) are safely sent to the reinjection well (1).

In another preferred embodiment of the invention, said gas injection system comprises at least one well inlet valve (13) which is located at the inlet of the reinjection well (1). Said well inlet valve (13) provides to open and close the inlet of the reinjection well (1). By this way, different materials (e.g. protective chemicals) are able to be sent through the inlet into the reinjection well (1) in necessary cases.

Said gas injection system provides to minimize greenhouse effects that are gradually made themselves more apparent in the global and local scale, and to extend productivity spans of the geothermal plants such that their activeness are maintained for a long period of time.

What is claimed is:

1. A gas injection system, comprising at least one reinjection well, wherein the at least one reinjection well enables a geothermal fluid received from a geothermal energy source via at least one production well to be delivered again to the geothermal energy source after being treated,
    at least one exchanger, wherein non-condensable gases from a geothermal plant are delivered to the at least one exchanger and the at least one exchanger allows decreasing a temperature of the non-condensable gases;
    at least one storage, wherein the non-condensable gases, having temperatures decreased by the at least one exchanger, are delivered to the at least one storage and stored in the at least one storage;
    at least one compressor, wherein the at least one compressor is provided at an outlet of the at least one storage and allows increasing a pressure of the non-condensable gases received from the at least one storage;
    at least one pump, wherein the at least one pump allows increasing a pressure of at least one part of a reinjection water received from the geothermal plant;
    at least a first line, wherein the reinjection water received from the at least one pump and having an increased pressure in the first line, and the non-condensable gases having an increased pressure from the at least one compressor are gathered and delivered to a reservoir by the at least one reinjection well;
    at least a first delivery line, wherein the first delivery line enables to deliver the non-condensable gases having the increased pressure to the first line;
    at least a second delivery line, wherein the second delivery line enables to deliver the reinjection water having the increased pressure to the first line;
    at least a first outlet line, wherein the first outlet line is in communication with the first line on at least one side, at least another side of the first line communicates with a lower part of the at least one reinjection well, and enables to deliver the reinjection water, received from the first line and having the increased pressure, and the non-condensable gases having the increased pressure, to the lower part of the at least one reinjection well;
    at least one water delivery line to allow receiving non-pressurized part of the reinjection water from the geothermal plant; and
    at least a second outlet line, wherein the second outlet line enables to deliver a relatively low-pressure reinjection water received from the at least one water delivery line to the at least one reinjection well.

2. The gas injection system according to claim 1, wherein the first outlet line is in a form of a tube.

3. The gas injection system according to claim 2, wherein the first outlet line is 800 meters in length.

4. The gas injection system according to claim 2, wherein at least one outlet hole is provided at a side of the first outlet line away from the first line.

5. The gas injection system according to claim 1, comprises at least one well inlet valve wherein the at least one well inlet valve is located at an inlet of the at least one reinjection well.

\* \* \* \* \*